(12) United States Patent
Hagidaira

(10) Patent No.: US 9,810,280 B2
(45) Date of Patent: Nov. 7, 2017

(54) DAMPING VALVE

(71) Applicant: KYB Corporation, Tokyo (JP)

(72) Inventor: Shinichi Hagidaira, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/021,731

(22) PCT Filed: Sep. 17, 2014

(86) PCT No.: PCT/JP2014/074552
§ 371 (c)(1),
(2) Date: Mar. 14, 2016

(87) PCT Pub. No.: WO2015/041247
PCT Pub. Date: Mar. 26, 2015

(65) Prior Publication Data
US 2016/0230832 A1 Aug. 11, 2016

(30) Foreign Application Priority Data

Sep. 17, 2013 (JP) .................................. 2013-191337

(51) Int. Cl.
*F16K 31/126* (2006.01)
*F16F 9/348* (2006.01)
(Continued)

(52) U.S. Cl.
CPC .......... *F16F 9/348* (2013.01); *F15B 13/0433* (2013.01); *F16F 9/34* (2013.01);
(Continued)

(58) Field of Classification Search
CPC .. F16F 9/348; F16F 9/3481; F16F 9/34; F16F 9/46; F16F 9/50; F16F 2228/066; F15B 13/0433
(Continued)

(56) References Cited

U.S. PATENT DOCUMENTS

| | | | | |
|---|---|---|---|---|
| 5,960,915 A | * | 10/1999 | Nezu ....................... | F16F 9/325 188/266.6 |
| 6,182,805 B1 | * | 2/2001 | Kashiwagi .............. | F16F 9/325 188/266.6 |

(Continued)

FOREIGN PATENT DOCUMENTS

| | | |
|---|---|---|
| CN | 101550981 A | 10/2009 |
| EP | 1158202 A2 | 11/2001 |

(Continued)

*Primary Examiner* — Minh Le
(74) *Attorney, Agent, or Firm* — Rabin & Berdo, P.C.

(57) ABSTRACT

A damping valve includes a valve seat member that includes a port and a first valve seat, a shaft member disposed on the valve seat member, an annular main valve element that is mounted on the shaft member, seats on and separates from the first valve seat, and includes a second valve seat on an opposite side of the valve seat member, a sub valve element that is mounted on the shaft member, and seats on and separates from the second valve seat, a valve-element-between chamber that is disposed between the main valve element and the sub valve element, and on an inner peripheral side of the second valve seat, a restrictive passage that causes the port to be communicated with the valve-element-between chamber to provide a resistance to a flow of a passing fluid, a main valve element biasing part biasing the main valve element to the valve seat member side, and a sub valve element biasing part biasing the sub valve element to the main valve element side. The restrictive passage is formed of a ring-shaped gap between the main valve element and the shaft member.

5 Claims, 5 Drawing Sheets

(51) Int. Cl.
*F16F 9/34* (2006.01)
*F16F 9/46* (2006.01)
*F16F 9/50* (2006.01)
*F15B 13/043* (2006.01)

(52) U.S. Cl.
CPC .............. *F16F 9/3481* (2013.01); *F16F 9/46* (2013.01); *F16F 9/50* (2013.01); *F16F 2228/066* (2013.01)

(58) Field of Classification Search
USPC .................. 137/488, 487.5, 489.5, 492.5
See application file for complete search history.

(56) References Cited

U.S. PATENT DOCUMENTS

| | | | | |
|---|---|---|---|---|
| 7,743,896 B2* | 6/2010 | Vanhees | ................ | F16F 9/464 188/266.6 |
| 7,926,632 B2* | 4/2011 | Mangelschots | ......... | F16F 9/464 188/266.2 |
| 8,584,818 B2* | 11/2013 | Murakami | .............. | F16F 9/348 188/322.13 |
| 8,794,400 B2* | 8/2014 | Nakadate | ................ | F16F 9/464 188/266.6 |
| 9,206,876 B2* | 12/2015 | Yamashita | ............ | F16F 9/3485 |
| 9,261,162 B2* | 2/2016 | Jee | ......................... | F16F 9/464 |
| 9,285,006 B2* | 3/2016 | Katayama | ............... | F16F 9/325 |
| 2009/0242339 A1 | 10/2009 | Nakadate et al. | | |
| 2016/0003320 A1* | 1/2016 | Kamakura | ............... | F16F 9/465 251/30.02 |
| 2016/0025176 A1* | 1/2016 | Kamakura | ................ | F16F 9/34 137/487.5 |
| 2016/0025177 A1* | 1/2016 | Abe | .......................... | F16F 9/46 251/25 |
| 2016/0025178 A1* | 1/2016 | Kamakura | ............... | F16F 9/464 251/25 |
| 2016/0025237 A1* | 1/2016 | Mori | ......................... | F16K 1/36 251/30.01 |

FOREIGN PATENT DOCUMENTS

| | | |
|---|---|---|
| EP | 2103835 A1 | 9/2009 |
| FR | 2883612 A1 | 9/2006 |
| JP | 2009-222136 A | 10/2009 |

* cited by examiner

DAMPING VALVE

TECHNICAL FIELD

The present invention relates to a damping valve.

BACKGROUND ART

As a damping valve, there has been a variable damping valve that makes a damping force of a shock absorber, which is interposed between a vehicle body and axle shafts in a vehicle, variable. As this damping valve, for example, the applicant of the present application has been proposed a damping valve that includes a valve seat member, a main valve element, a pilot passage, an orifice, a spool, a valve housing, a pilot valve, and a solenoid. The valve seat member includes a port passing through from a cylinder to a reservoir and an annular valve seat surrounding the port. The main valve element is laminated on the valve seat member, and is seated on and separated from the annular valve seat to open and close the port. The pilot passage is branched from the upstream of the port. The orifice is disposed on the middle of the pilot passage. The spool has a tubular shape, and is in contact with the opposite side of the annular valve seat of the main valve element. The valve housing includes the spool slidably mounted on the outer periphery of the valve housing, and forms a back pressure chamber on the back side of the main valve element with the spool. The pilot valve is disposed on the downstream of the pilot passage. The solenoid adjusts a valve opening pressure of the pilot valve. This damping valve guides a secondary pressure that is downstream of the orifice in the pilot passage into the back pressure chamber to cause the secondary pressure to press the main valve element.

In this damping valve, the pilot valve is disposed on the downstream of the back pressure chamber. Then, adjusting the valve opening pressure of the pilot valve by a thrust of the solenoid controls the secondary pressure guided into the back pressure chamber to functions as the valve opening pressure of the pilot valve.

On the back surface of the main valve element, the secondary pressure acts to press the main valve element on the annular valve seat side. On the front of the main valve element, a pressure to separate the main valve element from the annular valve seat acts from the upstream of the port. Accordingly, the damping valve opens when a force to separate the main valve element from the annular valve seat by the pressure on the upstream side of the port exceeds a force to press the main valve element on the valve seat by the secondary pressure.

That is, controlling the secondary pressure ensures the valve opening pressure of the damping valve to be adjusted. Adjusting the valve opening pressure of the pilot valve by the solenoid ensures a resistance provided to a flow of hydraulic oil passing through the passage by the damping valve to be variable. This causes the shock absorber to generate a desired damping force.

SUMMARY OF INVENTION

In this damping valve, to provide a large variable range of the damping force, the main valve element to open and close a main passage includes a sub valve element laminated on the back surface of the main valve element, and includes a restrictive passage passing through into a valve-element-between chamber between the main valve element and the sub valve element. This opens the main passage in two stages.

The main valve element is slidably mounted on the outer periphery of the spacer that is mounted on the outer periphery of a shaft disposed on the valve seat member and fixes the sub valve element. The main valve element is mounted in a floating state with respect to the valve seat member. This ensures the main valve element to widely open the port after separating from the annular valve seat. Thus, the main valve element is slidably mounted on the shaft, and guided by the spacer mounted on the shaft to move close to or away from the valve seat member. However, the inner circumference of the main valve element is possibly caught on the outer periphery of the spacer, or generates galling on the outer periphery (stick slip). This possibly causes the delay of the opening and closing response of the port of the main valve element to make obtaining the desired attenuation characteristics difficult, or to induce a vibration.

The main valve element is sometimes constituted of an elastic inner ring portion and an outer ring portion that is seated on and separated from a main valve seat disposed on the outer periphery of the inner ring portion. In this case, because the orifice that functions as the restrictive passage is disposed on the inner ring portion, the repeated deflection of the inner ring portion causes the disadvantage in ensuring the fatigue durability to make the design freedom of the bending rigidity low. Furthermore, the structure where the inner ring portion is hard to deflect because of the restrain of the outer periphery of the inner ring portion by the outer ring portion makes the outer ring portion to move hard with respect to the annular valve seat. This possibly causes the delay of the opening and closing response of the port of the main valve element to make obtaining the desired attenuation characteristics difficult, or to induce a vibration.

It is an object of the present invention to provide a damping valve that is configured to obtain the desired attenuation characteristics without inducing the vibration.

According to an aspect of the present invention, a damping valve including a valve seat member that includes a port and a first valve seat, the first valve seat surrounding the port; a shaft member disposed on the valve seat member; an annular main valve element mounted movable in an axial direction with respect to the shaft member, the main valve element seating on and separating from the first valve seat, and the main valve element including a second valve seat on an opposite side of the valve seat member; a sub valve element mounted on the shaft member, the sub valve element seating on and separating from the second valve seat; a valve-element-between chamber disposed between the main valve element and the sub valve element, and on an inner peripheral side of the second valve seat; a restrictive passage that causes the port to be communicated with the valve-element-between chamber to provide a resistance to a flow of a passing fluid; a main valve element biasing part configured to bias the main valve element to the valve seat member side; and a sub valve element biasing part configured to bias the sub valve element to the main valve element side, wherein the restrictive passage is formed of a ring-shaped gap between the main valve element and the shaft member.

DESCRIPTION OF EMBODIMENTS

The following describes a damping valve V according to an embodiment of the present invention with reference to drawings.

Figure 1:
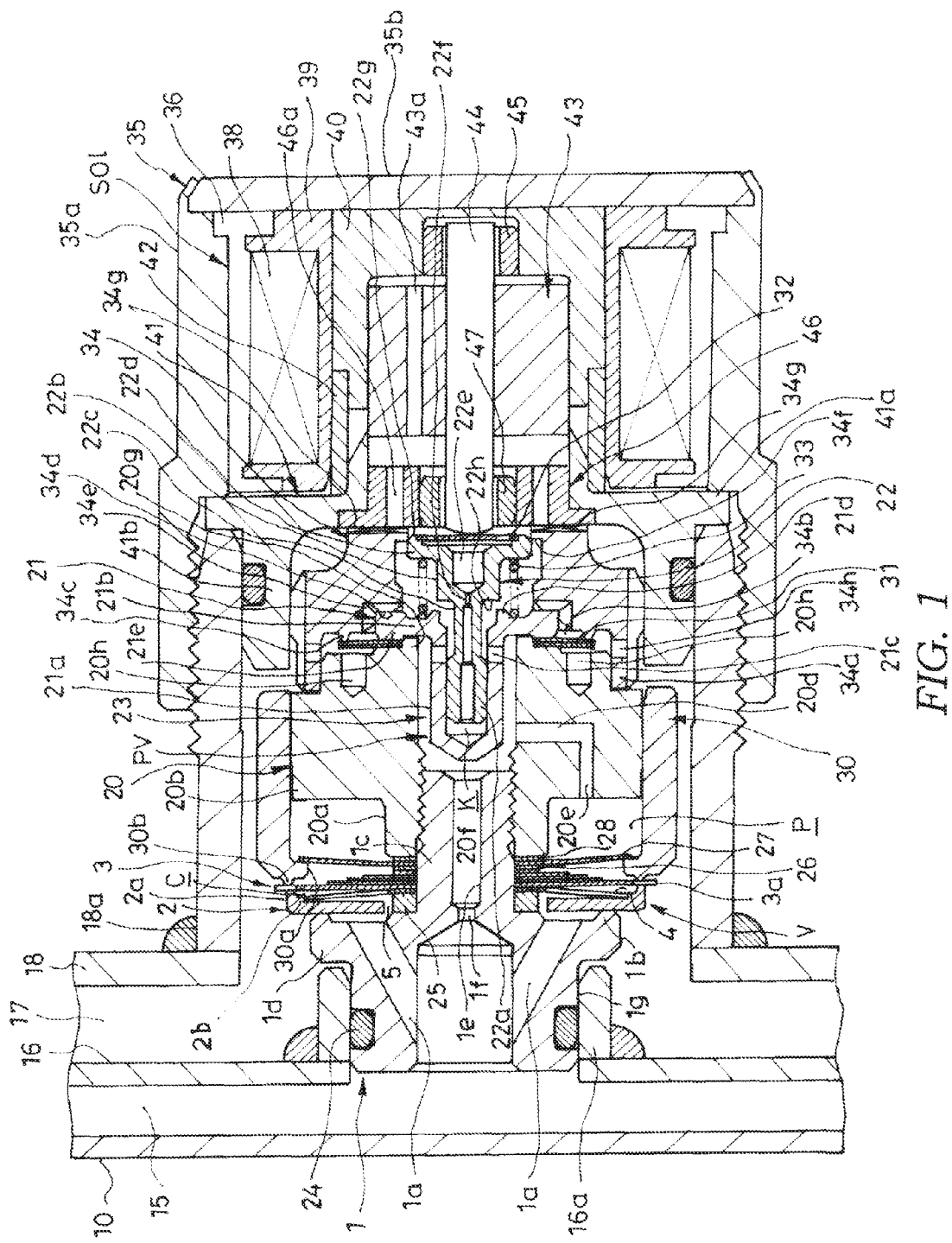
FIG. 1 is a cross-sectional view of a damping valve according to an embodiment of the present invention.

As illustrated in FIG. 1, the damping valve V includes a valve seat member 1, an assembling shaft 1c, a main valve element 2, a sub valve element 3, a valve-element-between chamber C, a restrictive passage 5, a disc spring 4, and a back pressure chamber P. The valve seat member 1 includes a port 1a and a first valve seat 1b that surrounds the port 1a. The assembling shaft 1c is a shaft member disposed on the valve seat member 1. The main valve element 2 is in a circular shape, and is mounted movable in an axial direction with respect to the assembling shaft 1c to seat on and separate from the first valve seat 1b. The main valve element 2 includes a second valve seat 2a on the opposite side of the valve seat member 1. The sub valve element 3 is mounted on the assembling shaft 1c, and seats on and separates from the second valve seat 2a. The valve-element-between chamber C is disposed between the main valve element 2 and the sub valve element 3, and on the inner peripheral side of the second valve seat 2a. The restrictive passage 5 causes the port 1a to be communicated with the valve-element-between chamber C to provide a resistance to a flow of a passing fluid. The disc spring 4 is a main valve element biasing part that biases the main valve element 2 to the valve seat member 1 side. The back pressure chamber P is a sub valve element biasing part that biases the sub valve element 3 to the main valve element 2 side.

The damping valve V is applied to a shock absorber D. The shock absorber D provides the resistance to a hydraulic fluid passing through the port 1a mainly at the time of expansion and contraction to generate a damping force.

Figure 2:
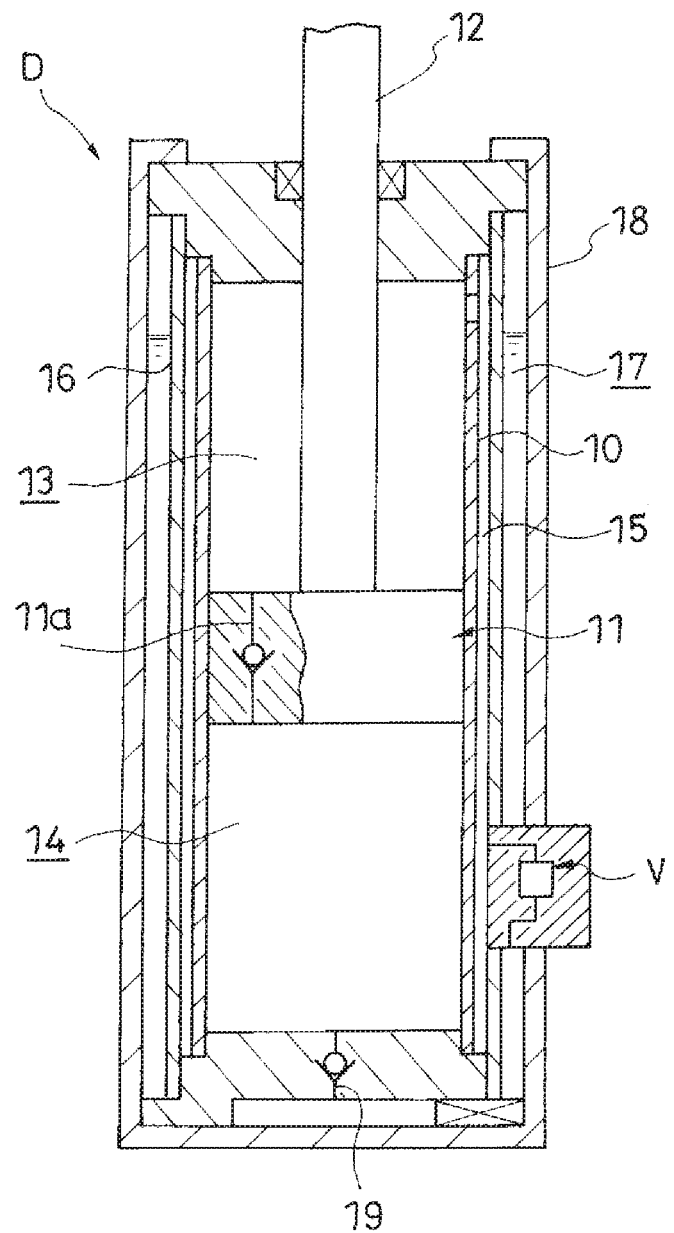
FIG. 2 is a cross-sectional view of a shock absorber to which the damping valve according to the embodiment of the present invention is applied.

As illustrated in FIG. 2, the shock absorber D to which the damping valve V is applied includes, for example, a cylinder 10, a piston 11, a rod 12, a rod-side chamber 13 and a piston-side chamber 14, an intermediate pipe 16, and an outer pipe 18. The piston 11 is slidably inserted into the cylinder 10. The rod 12 is inserted movable into the cylinder 10 and coupled to the piston 11. The rod-side chamber 13 and the piston-side chamber 14 are defined by the piston 11 inserted into the cylinder 10. The intermediate pipe 16 covers the outer periphery of the cylinder 10 to form a discharge passage 15 between the cylinder 10 and the intermediate pipe 16. The outer pipe 18 covers the outer periphery of the intermediate pipe 16 to form a reservoir 17 between the intermediate pipe 16 and the outer pipe 18. In the shock absorber D, hydraulic oil is filled as a hydraulic fluid in the rod-side chamber 13, the piston-side chamber 14, and the reservoir 17. In the reservoir 17, a gas is also filled other than the hydraulic oil. It should be noted that, as the hydraulic fluid, a fluid that can generate the damping force may be employed other than the hydraulic oil.

The shock absorber D includes a suction passage 19 and a piston passage 11a. The suction passage 19 allows only a flow of the hydraulic oil from the reservoir 17 toward the piston-side chamber 14. The piston passage 11a is disposed on the piston 11, and allows only a flow of the hydraulic oil from the piston-side chamber 14 toward the rod-side chamber 13. The discharge passage 15 causes the rod-side chamber 13 to be communicated with the reservoir 17. The damping valve V provides the resistance to the flow of the hydraulic oil passing through the port 1a (see FIG. 1) that causes the reservoir 17 to be communicated with the discharge passage 15.

In the shock absorber D, when a compression operation is performed, the piston 11 moves to one direction (downward in FIG. 2) to compress the piston-side chamber 14. Then, the hydraulic oil in the piston-side chamber 14 moves to the rod-side chamber 13 through the piston passage 11a. In this compression operation, the rod 12 enters into the cylinder 10. Then, in the cylinder 10, the hydraulic oil becomes excessive by the volume of the rod 12 entering into the cylinder 10. Accordingly, the excessive hydraulic oil is extruded from the cylinder 10 to be discharged to the reservoir 17 through the discharge passage 15. The shock absorber D uses the damping valve V to provide the resistance to the flow of the hydraulic oil that moves to the reservoir 17 passing through the discharge passage 15. This raises the pressure in the cylinder 10 to generate a pressure side damping force.

On the other hand, in the shock absorber D, when an expansion operation is performed, the piston 11 moves to the other direction (upward in FIG. 2) to compress the rod-side chamber 13. Then, the hydraulic oil in the rod-side chamber 13 moves to the reservoir 17 through the discharge passage 15. In this expansion operation, the piston 11 moves to the other direction to expand the volume of the piston-side chamber 14. In the piston-side chamber 14, the hydraulic oil is supplied from the reservoir 17 through the suction passage 19 by the volume of the expansion. The shock absorber D uses the damping valve V to provide the resistance to the flow of the hydraulic oil that moves to the reservoir 17 passing through the discharge passage 15. This raises the pressure in the rod-side chamber 13 to generate an expansion side damping force.

As described above, the shock absorber D is a uniflow type shock absorber where, in the expansion and contraction operation, the hydraulic oil is discharged to the reservoir 17 from inside the cylinder 10 through the discharge passage 15, and the hydraulic oil circulates the piston-side chamber 14, the rod-side chamber 13, and the reservoir 17 in order in one way. The shock absorber D can generate the damping forces of both the expansion and the pressure sides by single damping valve V.

Next, a description will be given of the respective portions of the damping valve V in detail.

The damping valve V includes the valve seat member 1, the circular main valve element 2, the circular sub valve element 3, the valve-element-between chamber C, the restrictive passage 5, and the disc spring 4. The valve seat member 1 fits to a sleeve 16a disposed on the opening portion of the intermediate pipe 16. The main valve element 2 is mounted on the outer periphery of the assembling shaft 1c, which is disposed on the valve seat member 1, in a floating state, and seated on and separated from the first valve seat 1b. The sub valve element 3 is mounted on the outer periphery of the assembling shaft 1c disposed on the valve seat member 1. The valve-element-between chamber C is disposed between the main valve element 2 and the sub valve element 3. The restrictive passage 5 causes the port 1a to communicate with the valve-element-between chamber C. The disc spring 4 biases the main valve element 2 to the valve seat member 1 side. Other than these portions, the damping valve V includes a valve housing 20, a cylindrical pilot valve seat member 21, a pilot valve element 22, and a solenoid Sol. The valve housing 20 has a hollow structure and is coupled to the assembling shaft 1c of the valve seat member 1. The pilot valve seat member 21 is housed in the valve housing 20. The pilot valve element 22 is slidably inserted into the pilot valve seat member 21. The solenoid Sol provides the pilot valve element 22 with the thrust. The valve seat member 1 and the valve housing 20 internally includes a pilot passage 23 to guide the pressure of the upstream side of the port 1a to the back pressure chamber P with reducing the pressure.

As illustrated in FIG. 1, the valve seat member 1 includes a base portion 1d, the assembling shaft 1c, a hollow portion 1e, an orifice 1f, a plurality of the ports 1a, and the circular first valve seat 1b. The base portion 1d has a large diameter and is fit inside the sleeve 16a. The assembling shaft 1c projects from the base portion 1d in the axial direction (rightward in FIG. 1). The hollow portion 1e is disposed to pass through the base portion 1d and the assembling shaft 1c in the axial direction, and forms a part of the pilot passage 23. The orifice 1f is disposed in the middle of the hollow portion 1e. The plurality of the ports 1a passes through the base portion 1d from one end (left end in FIG. 1) to the other end (right end in FIG. 1). The first valve seat 1b is disposed on the other end (right end in FIG. 1) of the base portion 1d, and on the outer periphery side of the outlet of the port 1a.

The port 1a passes through the base portion 1d as described above. An opening of the port 1a disposed on the one end side (left end in FIG. 1) of the base portion 1d communicates with inside the rod-side chamber 13 through the discharge passage 15 formed by the intermediate pipe 16. An opening of the port 1a disposed on the other end side (right end in FIG. 1) of the base portion 1d communicates with the reservoir 17. That is, the shock absorber D discharges the hydraulic oil to the reservoir 17 from the rod-side chamber 13 through the discharge passage 15 and the port 1a at the time of expansion and contraction. At this time, the upstream of the port 1a is the rod-side chamber 13. An opening of the hollow portion 1e disposed on the one end side (left end in FIG. 1) communicates with inside the rod-side chamber 13 through the discharge passage 15 as well as the port 1a.

It should be noted that, the valve seat member 1 includes a small-diameter portion 1g formed by making the one end side (left side in FIG. 1) of the base portion 1d in a small diameter. The mall-diameter portion 1g fits to inside the sleeve 16a. On the outer periphery of the small-diameter portion 1g, a seal ring 24 is mounted to seal between the sleeve 16a and the small-diameter portion 1g. Then, the discharge passage 15 is configured not to communicate with the reservoir 17 through the outer periphery of the base portion 1d.

On the other end (right end in FIG. 1) of the base portion 1d of the valve seat member 1, the main valve element 2 that seats on and separates from the first valve seat 1b to open and close the port 1a is laminated. The main valve element 2 has a ring shape, and includes the circular second valve seat 2a and a circular protrusion 2b. The second valve seat 2a is disposed on the outer periphery of the opposite side of the valve seat member 1 and projects. The protrusion 2b is disposed on the opposite side of the valve seat member 1 and the inner peripheral side of the second valve seat 2a.

Specifically, the main valve element 2 is mounted on the outer periphery of the assembling shaft 1c of the valve seat member 1, and disposed on the outer periphery of a circular spacer 25 movable in the axial direction. The inner diameter of the main valve element 2 is formed in a large diameter compared with the outer diameter of the spacer 25. Between the main valve element 2 and the spacer 25, a ring-shaped gap is disposed. This ring-shaped gap forms the restrictive passage 5.

It should be noted that, if the spacer 25 is not necessary to be disposed, the ring-shaped gap may be disposed between the assembling shaft 1c and the main valve element 2 to form the restrictive passage 5. The spacer 25 is mounted on the outer periphery of the assembling shaft 1c to fix the sub valve element 3 on the outer periphery of the assembling shaft 1c. In this embodiment, the spacer 25 is integrated with the assembling shaft 1c to configure the shaft member with the assembling shaft 1c. The spacer 25 is configured such that the thickness of the spacer 25 in the axial direction is larger than the thickness of the inner periphery of the main valve element 2 in the axial direction. This ensures the main valve element 2 to move in the axial direction (right-left direction in FIG. 1).

Thus, the main valve element 2 is assembled in a state where the main valve element 2 is movable in the axial direction with respect to the valve seat member 1. Then, the main valve element 2 moves close to or away from the valve seat member 1 to seat on and separate from the first valve seat 1b. In a state where the main valve element 2 is separated from the first valve seat 1b, the main valve element 2 opens the port 1a, and in a state where the main valve element 2 is seated on the first valve seat 1b, the main valve element 2 obstructs the outlet end of the port 1a.

On the back side of the main valve element 2, the sub valve element 3 is laminated. Between the sub valve element 3 and the spacer 25, the disc spring 4 to bias the main valve element 2 toward the first valve seat 1b is interposed. The sub valve element 3 is a circular laminated leaf valve. The inner periphery of the sub valve element 3 is assembled on the assembling shaft 1c with the disc spring 4. The sub valve element 3 is sandwiched by the spacer 25 and the valve housing 20 that is screw-fastened to the assembling shaft 1c.

The disc spring 4 includes three arm portions that functions as a spring on the outer periphery of the annular portion. The annular portion is sandwiched by the spacer 25 and the valve housing 20. The free end of the arm portion is fitted on the inner periphery of the circular protrusion 2b that is disposed on the opposite side end portion of the valve seat member 1 of the main valve element 2. The disc spring 4 not only biases the main valve element 2 toward the first valve seat 1b, but also determines the position of the main valve element 2 with respect to the valve seat member 1 in the radial direction. This prevents the main valve element 2 from moving freely in the radial direction with respect to the valve seat member 1.

It should be noted that, the protrusion 2b of the main valve element 2 may be in a shape other than the ring-shape if the disc spring 4 can determine the position of the main valve element 2 in the radial direction. For example, the position of the main valve element 2 in the radial direction may be determined by disposing a plurality of protrusions that faces to the outer periphery of the disc spring 4 in the circumferential direction instead of the circular protrusion 2b. As a main valve element biasing part, other than the disc spring 4, a configuration where a part secured by the spacer 25 is made as a ring-shaped portion that has a plurality of arm portions with elasticity extending radially from the ring-shaped portion, and the arm portion determines the position of and biases the main valve element 2 may be employed. An elastic body such as a spring washer or a rubber can be used as the main valve element biasing part.

On the other hand, the sub valve element 3 is allowed a deflection on the outer periphery side to be ensured to seat on and separate from the second valve seat 2a of the main valve element 2. The inner periphery of the sub valve element 3 is laminated on the spacer 25, and the outer periphery seats on the second valve seat 2a. Between the sub valve element 3 and the main valve element 2, a space exists. This space is the valve-element-between chamber C.

The sub valve element 3 is a laminated leaf valve where a plurality of annular plates is laminated, and the number of the annular plates is arbitrary. On the outer periphery of the annular plate seating on the second valve seat 2a, an orifice 3a formed in a cutout shape is disposed. The orifice 3a may be formed by such as a cutout on the second valve seat 2a of the main valve element 2 instead of the sub valve element 3, or may be disposed on a contacting portion of the valve seat member 1 to the first valve seat 1b or a contacting portion of the main valve element 2 to the second valve seat 2a.

The valve-element-between chamber C communicates with the port 1a through the restrictive passage 5 between the main valve element 2 and the spacer 25. The disc spring 4 allows the hydraulic oil to pass through between the arm portion and the arm portion. This prevents the valve-element-between chamber C from obstructed. It should be noted that, the disc spring 4 is not limited to the above-described structure insofar as the structure not obstructing the valve-element-between chamber C. When the disc spring 4 is constituted of the annular portion and the plurality of the arm portions, the installation number of the arm portion can be arbitrarily set. When the disc spring 4 determines the position of the main valve element 2, the installation of three or more arm portions is preferable. The restrictive passage 5 provides the resistance with respect to the flow of the passing hydraulic oil. When the hydraulic oil that passed through the port 1a moves to the valve-element-between chamber C of the main valve element 2 through the restrictive passage 5, a differential pressure is generated between the pressure in the valve seat member 1 side as the front side of the main valve element 2 and the pressure of the valve-element-between chamber C in the back side.

Until the sub valve element 3 deflects to separate from the second valve seat 2a of the main valve element 2, the hydraulic oil that passed through the port 1a flows to the reservoir 17 through the restrictive passage 5, the valve-element-between chamber C, and the orifice 3a. At this time, the port 1a remains to be closed.

When the sub valve element 3 is deflected by the pressure acting to the inside of the valve-element-between chamber C via the restrictive passage 5 to separate from the second valve seat 2a, the ring-shaped gap is formed between the second valve seat 2a of the main valve element 2 and the sub valve element 3. This causes the hydraulic oil that passed through the port 1a and the restrictive passage 5 to move to the reservoir 17 passing between the sub valve element 3 and the main valve element 2. That is, even if the main valve element 2 seats on the first valve seat 1b, when the sub valve element 3 deflects to separate from the second valve seat 2a, the port 1a is opened to communicate with the reservoir 17.

When the sub valve element 3 deflects and the main valve element 2 is pushed up by the pressure receiving from the port 1a, the entire main valve element 2 separates from the valve seat member 1 to separate from the first valve seat 1b.

In this case, the hydraulic oil that passed through the port 1a is discharged to the reservoir 17 through the ring-shaped gap generated between the main valve element 2 and the first valve seat 1b.

On the other end side (right side in FIG. 1) of the sub valve element 3, a distance piece 26, a circular plate spring 27, and a distance piece 28 are laminated in order to be assembled to the assembling shaft 1c. On the distal end (right end in FIG. 1) of the assembling shaft 1c, the valve housing 20 is screwed. This causes the spacer 25, the sub valve element 3, the distance piece 26, the plate spring 27, and the distance piece 28, which are assembled to the assembling shaft 1c, to be sandwiched by the base portion 1d of the valve seat member 1 and the valve housing 20 to be secured. It should be noted that, the main valve element 2 mounted on the outer periphery of the spacer 25 is disposed on the outer periphery of the spacer 25 in a floating state, and is movable in the axial direction. The plate spring 27 is disposed such that the inner periphery of the plate spring 27 is secured to the assembling shaft 1c and the outer periphery is a free end.

As illustrated in FIG. 1, the valve housing 20 is in a cylindrical shape, and includes a small-diameter pipe portion 20a, a large-diameter pipe portion 20b, a pressure introduction horizontal hole 20d, and a pressure introduction vertical hole 20e. The small-diameter pipe portion 20a is disposed on the one end side (left side in FIG. 1) and has a small outer diameter. The large-diameter pipe portion 20b is disposed on the other end side (right side in FIG. 1) and has a large outer diameter compared with the small-diameter pipe portion 20a. The pressure introduction horizontal hole 20d passes to the inner periphery of the large-diameter pipe portion 20b. The pressure introduction vertical hole 20e opens on the one end (left end in FIG. 1) of the large-diameter pipe portion 20b and communicates with the pressure introduction horizontal hole 20d. Inserting and screwing the assembling shaft 1c of the valve seat member 1 into a screw hole portion 20f, which is disposed inside the small-diameter pipe portion 20a, causes the valve housing 20 to be coupled to the valve seat member 1. It should be noted that the pressure introduction horizontal hole 20d and the pressure introduction vertical hole 20e may be formed as, for example, an obliquely disposed single hole.

The large-diameter pipe portion 20b includes a ring-shaped protrusion 20g on the inner peripheral side of the other end (right end in FIG. 1), and a plurality of tool holes 20h opening from also the other end (right end in FIG. 1) surface. Inserting a tool into the tool hole 20h and rotating the tool causes the valve housing 20 to be easily screwed to the assembling shaft 1c.

The valve housing 20 includes a cylindrical spool 30 slidably mounted on the outer periphery of the large-diameter pipe portion 20b. The spool 30 is formed in a pipe shape. The spool 30 includes a flange 30a and a ring-shaped protrusion 30b. The flange 30a projects from the one end (left end in FIG. 1) to the inner periphery. The ring-shaped protrusion 30b projects from also the one end to the axial direction. The spool 30 is movable in the axial direction (right-left direction in FIG. 1) with respect to the valve housing 20.

On the inside end portion (right end portion in FIG. 1) of the flange 30a, the outer periphery of the plate spring 27 abuts. The spool 30 is biased toward the sub valve element 3 side (left side in FIG. 1) by the plate spring 27. The ring-shaped protrusion 30b abuts on the side face of the sub valve element 3.

The spool 30 defines the back pressure chamber P between the plate spring 27 of the inner peripheral side of the spool 30 and the valve housing 20. The back pressure chamber P communicates with the inside of the valve housing 20 through the pressure introduction vertical hole 20e and the pressure introduction horizontal hole 20d.

The inside of the valve housing 20 passes to the hollow portion 1e of the valve seat member 1, and communicates with the inside of the rod-side chamber 13 as the upstream of the port 1a through the orifice 1f. Then, the hydraulic oil discharged from the rod-side chamber 13 is guided to the back pressure chamber P through the orifice 1f. That is, the pressure of the upstream of the port 1a is reduced by the orifice 1f to be guided to the back pressure chamber P.

According to the above description, on the back surface of the sub valve element 3, other than the biasing force of the plate spring 27 to bias the spool 30, the biasing force to press the sub valve element 3 toward the main valve element 2 by the internal pressure of the back pressure chamber P acts. That is, in the expansion and contraction operation of the shock absorber D, the main valve element 2 receives the pressure inside the rod-side chamber 13 from the front side via the port 1a, and receives the internal pressure of the back pressure chamber P and the biasing force of the plate spring 27 from the back side via the sub valve element 3 in addition to the biasing force of the disc spring 4.

The sub valve element 3 receives a force obtained by multiplying the inner diameter cross-sectional area of the other end side (right side in FIG. 1) of the flange 30a of the spool 30 by the pressure of the back pressure chamber P in the direction pressing to the main valve element 2. The sub valve element 3 receives a force obtained by multiplying the inner diameter cross-sectional area of the second valve seat 2a by the pressure of the valve-element-between chamber C in the direction away from the main valve element 2. An intensification ratio that is a ratio of the pressure inside the back pressure chamber P to the valve opening pressure of the sub valve element 3 is decided by the ratio of the inner diameter cross-sectional area of the other end side (right side in FIG. 1) of the flange 30a of the spool 30 to the inner diameter cross-sectional area of the second valve seat 2a. It should be noted that a hole may be disposed on the plate spring 27 to cause the pressure inside the back pressure chamber P to directly act to the sub valve element 3.

When the pressure inside the rod-side chamber 13 increases the pressure inside the valve-element-between chamber C, and the force to deflect the outer periphery of the sub valve element 3 toward the other direction (rightward in FIG. 1) overcomes the resultant force of the internal pressure of the back pressure chamber P and the biasing force of the plate spring 27, the sub valve element 3 deflects to separate from the second valve seat 2a. Then, this forms a gap between the sub valve element 3 and the main valve element 2 to open the port 1a. In this embodiment, the inner diameter of the second valve seat 2a is large compared with the inner diameter of the first valve seat 1b. That is, there is a difference between a pressure-receiving area of the main valve element 2 to receive the pressure of the port 1a side and a pressure-receiving area of the main valve element 2 to receive the pressure of the valve-element-between chamber C side. Accordingly, until the differential pressure generated by the restrictive passage 5 reaches the valve opening pressure to separate the main valve element 2 from the first valve seat 1b, the main valve element 2 remains to seat on the first valve seat 1b.

On the other hand, in a state where the sub valve element 3 is deflected to be opened, and when the differential pressure generated by the restrictive passage 5 reaches the valve opening pressure to separate the main valve element 2 from the first valve seat 1b, the main valve element 2 also separates from the first valve seat 1b to open the port 1a. The intensification ratio in the sub valve element 3 is configured to be small compared with the intensification ratio in the main valve element 2 as a ratio of the valve opening pressure of the main valve element 2 with respect to the pressure of the valve-element-between chamber C. That is, the pressure inside the rod-side chamber 13 at the opening of the sub valve element 3 is low compared with the pressure inside the rod-side chamber 13 at the opening of the main valve element 2. That is, the valve opening pressure of the sub valve element 3 is configured to be low compared with the valve opening pressure of the main valve element 2.

On the other end side (right side in FIG. 1) with respect to the screw hole portion 20f in the valve housing 20, the cylindrical pilot valve seat member 21 is housed. The pilot valve seat member 21 includes a valve housing cylinder 21a, a flange portion 21b, a through hole 21c, a circular pilot valve seat 21d, and a circular valve holding portion 21e. The valve housing cylinder 21a is in the shape of a cylinder with a closed bottom. The flange portion 21b projects from the outer periphery of the other end (right end in FIG. 1) of the valve housing cylinder 21a toward the outer periphery. The through hole 21c opens from the side face of the valve housing cylinder 21a in the radial direction to communicate with the inside. The pilot valve seat 21d projects to the other end (right edge in FIG. 1) of the valve housing cylinder 21a toward the axial direction. The valve holding portion 21e is disposed on the outer periphery of the flange portion 21b with a greater thickness than the flange portion 21b.

The ring-shaped protrusion tog of the valve housing 20 mounts a fail valve element 31 constituted of the circular laminated leaf valve on the outer periphery. The fail valve element 31 is sandwiched by the other end (right end in FIG. 1) of the large-diameter pipe portion 20b of the valve housing 20 and the valve holding portion 21e of the pilot valve seat member 21. The fail valve element 31 is configured such that the inner periphery is fixed and the outer periphery deflects.

The pilot valve element 22 is inserted into the valve housing cylinder 21a of the pilot valve seat member 21 slidably in the axial direction. The pilot valve element 22 includes a small-diameter portion 22a, a large-diameter portion 22b, a circular depressed portion 22c, a flange-like spring bearing portion 22d, a communication passage 22e, an orifice 22f, and a ring-shaped protrusion 22g. The small-diameter portion 22a is disposed on the pilot valve seat member 21 side (left end side in FIG. 1) to be slidably inserted into the valve housing cylinder 21a. The large-diameter portion 22b is disposed on the opposite side of the pilot valve seat member 21 (right end side in FIG. 1). The depressed portion 22c is disposed between the small-diameter portion 22a and the large-diameter portion 22b. The spring bearing portion 22d is disposed on the outer periphery of the end portion on the opposite side of the pilot valve seat member 21. The communication passage 22e passes through the pilot valve element 22 from the forward end to the rear end. The orifice 22f is disposed in the middle of the communication passage 22e. The ring-shaped protrusion 22g is disposed on the outer periphery of the end portion on the opposite side of the pilot valve seat member 21 of the spring bearing portion 22d.

The depressed portion 22c of the pilot valve element 22 is constantly opposing to the through hole 21c when the pilot valve element 22 moves with respect to the pilot valve seat member 21 in the axial direction within an allowable range. This prevents the pilot valve element 22 from obstructing the through hole 21c.

The pilot valve element 22 is configured such that the outer diameter of the opposite side of the pilot valve seat member 21 is the large diameter with the depressed portion 22c as a border. The pilot valve element 22 includes a circular seating portion 22h opposing to the pilot valve seat 21d on the one end (left end in FIG. 1) of the large-diameter portion 22b. Moving of the pilot valve element 22 in the axial direction with respect to the pilot valve seat member 21 causes the seating portion 22h to seat on and separate from the pilot valve seat 21d. Thus, the pilot valve element 22 and the pilot valve seat member 21 constitute a pilot valve PV. The pilot valve PV is closed when the seating portion 22h seats on the pilot valve seat 21d.

On the end portion of the opposite side of the pilot valve seat member 21 in the spring bearing portion 22d, a perforated disk 32 fitting on the inner periphery of the ring-shaped protrusion 22g is laminated. The communication passage 22e communicates with the back side (right end side in FIG. 1) of the perforated disk 32 through the hole of the perforated disk 32. Between the spring bearing portion 22d and the flange portion 21b, a coiled spring 33 that biases the pilot valve element 22 to the opposite side of the pilot valve seat member 21 is interposed. The coiled spring 33 constantly biases the pilot valve element 22 to the opposite side of the pilot valve seat member 21. The pilot valve PV is in a state where the valve is opened when the thrust by the solenoid Sol, which will be described later, opposing to the coiled spring 33 (described later) does not act. It should be noted that, while the coiled spring 33 is used to bias the pilot valve element 22 toward the direction to cause the pilot valve element 22 to separate from the pilot valve seat member 21, an elastic body that can provide a biasing force may be employed other than the coiled spring 33.

When the pilot valve element 22 is inserted into the valve housing cylinder 21a of the pilot valve seat member 21, the pilot valve element 22 defines a space K on the forward end side with respect to the through hole 21c in the valve housing cylinder 21a. The space K communicates with the outside of the pilot valve PV through the communication passage 22e and the orifice 22f, which are disposed in the pilot valve element 22. This causes the space K to functions as a dashpot when the pilot valve element 22 moves in the axial direction (right-left direction in FIG. 1) with respect to the pilot valve seat member 21. Then, the urgent move of the pilot valve element 22 can be reduced, and oscillatory motions of the pilot valve element 22 can be reduced.

The pilot valve element 22 includes a fail valve seat member 34 that is laminated on the other side (right side in FIG. 1) of the valve housing 20 on the outer periphery. The fail valve seat member 34 includes a socket portion 34a, a ring-shaped window 34b, a fail valve seat 34c, a ring-shaped depressed portion 34d, a plurality of passages 34e, a circular flange 34f, a plurality of cutouts 34g, and a through hole 34h. The socket portion 34a is formed in a ring shape, and fits to the outer periphery of the large-diameter pipe portion lob of the valve housing 20. The ring-shaped window 34b is disposed on the end portion of the valve housing 20 side (left side in FIG. 1). The fail valve seat 34c is disposed on the outer periphery of the ring-shaped window 34b. The ring-shaped depressed portion 34d is disposed on the inner peripheral side of the ring-shaped window 34b. The passage 34e is formed from the inner periphery to the ring-shaped depressed portion 34d, and communicates with the ring-shaped window 34b. The flange 34f is disposed to project to the inner periphery of the end portion of the opposite side (right side in FIG. 1) of the valve housing 20. The cutout 34g is disposed on the end portion of the opposite side (right side in FIG. 1) of the valve housing 20. The through hole 34h passes through the socket portion 34a in the radial direction.

The inner diameter of the other part except the flange 34f in the fail valve seat member 34 has the size without interference with the move of the pilot valve element 22. In a state where the pilot valve element 22 does not receive the thrust from the solenoid Sol, when the coiled spring 33 biases the pilot valve element 22 to the other direction (rightward in FIG. 1), the outer periphery of the ring-shaped protrusion 22g of the pilot valve element 22 abuts on the flange 34f. At this time, the pilot valve element 22 cannot move more to the opposite side (right side in FIG. 1) of the valve housing 20. This causes the pilot valve element 22 to obstruct the opening end of the fail valve seat member 34 on the opposite side (right side in FIG. 1) of the valve housing 20.

Laminating the fail valve seat member 34 on the valve housing 20 causes the valve holding portion 21e of the pilot valve seat member 21 to fit to the inside of the ring-shaped depressed portion 34d. This causes the fail valve seat member 34 and the valve housing 20 to interpose and fix the valve holding portion 21e with the fail valve element 31. Then, the valve housing 20 houses the valve housing cylinder 21a of the pilot valve seat member 21, and the outer periphery of the valve holding portion 21e fits to the ring-shaped depressed portion 34d of the fail valve seat member 34. This ensures the pilot valve seat member 21 to be determined the position in the radial direction with respect to the fail valve seat member 34.

The fail valve element 31 seats on the fail valve seat 34c of the fail valve seat member 34 to obstruct the ring-shaped window 34b. When the fail valve element 31 is deflected by the action of the pressure from the ring-shaped window 34b side, the fail valve element 31 separates from the fail valve seat 34c to open the ring-shaped window 34b. This ensures the passage 34e to communicate with the reservoir 17 via the through hole 34h. Thus, the fail valve element 31 and the fail valve seat member 34 constitute a fail valve F. It should be noted that the passage 34e is formed by a groove disposed on the valve housing side of the fail valve seat member 34. Then, the passage 34e is considerably easily processed. It should be noted that, a hole may be disposed to form the passage 34e instead of the groove.

As described above, the damping valve V uses the port 1a to cause the rod-side chamber 13 to communicate with the reservoir 17. Then, the damping valve V uses the main valve element 2 and the sub valve element 3 to open and close the port 1a. Other than the route passing through the port 1a, the rod-side chamber 13 is communicated with the reservoir 17 through the pilot passage 23 constituted of the hollow portion 1e of the valve seat member 1, the inside of the valve housing 20, the through hole 21c of the pilot valve seat member 21, the inside of the pilot valve seat member 21, the depressed portion 22c of the pilot valve element 22, the inside of the fail valve seat member 34, and the cutout 34g.

The pilot passage 23 is communicated with the back pressure chamber P through the pressure introduction horizontal hole 20d and the pressure introduction vertical hole 20e of the valve housing 20. The orifice 1f, which is disposed in the middle of the pilot passage 23, reduces the pressure of the upstream of the port 1a to introduce to the back pressure chamber P. The pilot valve PV opens and closes the pilot passage 23. The pilot passage 23 can adjust the degree of opening of the pilot valve PV to control the pressure inside the back pressure chamber P. The pilot passage 23 includes the solenoid Sol that provides the thrust to the pilot valve element 22 to adjust the degree of opening of the pilot valve PV.

When the coiled spring 33 biases the pilot valve element 22, the outer periphery of the ring-shaped protrusion 22g of the pilot valve element 22 abuts on the flange 34f to cut the communicating of the cutout 34g with the inside of the fail valve seat member 34. In this state, when the pressure inside the pilot passage 23 is increased to reach the valve opening pressure of the fail valve element 31, the fail valve element 31 separates from the fail valve seat 34c. This ensures the pilot passage 23 to communicate with the reservoir 17 via the passage 34e, the ring-shaped depressed portion 34d, and the through hole 34h.

The solenoid Sol is housed in a case 35 that is in the shape of a cylinder with a closed bottom. The case 35 is screwed to the outer periphery of a sleeve 18a mounted on the opening of the outer pipe 18. The solenoid Sol includes a circular solenoid bobbin 39, a first fixed iron core 40, a second fixed iron core 41, a filler ring 42, a movable iron core 43, and a shaft 44. The solenoid bobbin 39 is wound around by a winding wire 38 and fixed on the bottom portion of the case 35. The first fixed iron core 40 is in the shape of a cylinder with a closed bottom and fits to the inner periphery of the solenoid bobbin 39. The second fixed iron core 41 is in the shape of a cylinder and fits to the inner periphery of the solenoid bobbin 39. The filler ring 42 is a nonmagnetic material, fits to the inner periphery of the solenoid bobbin 39, and forms a void between the first fixed iron core 40 and the second fixed iron core 41. The movable iron core 43 is in the shape of a cylinder and disposed on the inner peripheral side of the first fixed iron core 40. The shaft 44 is secured to the inner periphery of the movable iron core 43.

The case 35 includes a pipe portion 35a and a bottom portion 35b to which the opening end of the pipe portion 35a is crimped and secured. When the opening end of the pipe portion 35a is crimped, a bobbin holder 36 is secured to the inner periphery of the pipe portion 35a. The bobbin holder 36 holds the solenoid bobbin 39. The solenoid bobbin 39 is mounted on the case 35 via the bobbin holder 36.

Then, when the case 35 is screwed to the sleeve 18a, a flange 41a of the outer periphery of the second fixed iron core 41 is sandwiched between the case 35 and the sleeve 18a. This causes the second fixed iron core 41 to internally secure the filler ring 42 and the first fixed iron core 40 to the case 35.

The movable iron core 43 is formed in a cylindrical shape, and on the inner periphery of the movable iron core 43, the shaft 44 extending from both ends of the movable iron core 43 in the axial direction (right-left direction in FIG. 1) is mounted. The shaft 44 is held movably in the axial direction by a circular bush 45 and a circular bush 47. The bush 45 is disposed on the bottom portion of the first fixed iron core 40. The bush 47 is held on the inner periphery of a circular guide 46 fitting to the inner periphery of the second fixed iron core 41. The bushes 45 and 47 guide the shaft 44 to move in the axial direction.

When the second fixed iron core 41 is secured to the case 35, the guide 46 fitting to the inner periphery of the second fixed iron core 41 abuts on the fail valve seat member 34 to secure the fail valve seat member 34, the pilot valve seat member 21, the valve housing 20, and the valve seat member 1 to the shock absorber D. At this time, disposing the cutout 34g prevents the pilot passage 23 from obstructed even if the guide 46 abuts on the other end (right end in FIG. 1) of the fail valve seat member 34.

The one end (left end in FIG. 1) of the shaft 44 abuts on the perforated disk 32 fitting to the other end (right end in FIG. 1) of the pilot valve element 22. The biasing force of the coiled spring 33 also acts to the shaft 44 via the pilot valve element 22. The coiled spring 33 biases not only the pilot valve element 22, but also the shaft 44 as one component of the solenoid Sol.

The second fixed iron core 41 includes a cylindrical sleeve 41b that fits to the inner periphery of the sleeve 18a. This determines the position of each member constituting the solenoid Sol in the radial direction with respect to the sleeve 18a. It should be noted that, the fail valve seat member 34 includes a cutout on the outer periphery to prevent a space between the sleeve 41b and the fail valve seat member 34 from obstructed. This cutout ensures an enough flow passage area of the pilot passage 23. The length of the sleeve 41b in the axial direction is configured to avoid interference with the spool 30.

The guide 46 includes a hole 46a passing through in the axial direction. This prevents the pressure difference from occurring between the one end side (left side in FIG. 1) and the other end side (right side in FIG. 1) of the guide 46. Similarly, the movable iron core 43 includes a hole 43a passing through in the axial direction. This prevents the pressure difference from occurring between the one end side (left side in FIG. 1) and the other end side (right side in FIG. 1) of the movable iron core 43. Accordingly, the movable iron core 43 is ensured the smooth moving.

As described above, the solenoid Sol is configured such that a magnetic path passes through the first fixed iron core 40, the movable iron core 43, and the second fixed iron core 41. When the winding wire 38 is excited, the movable iron core 43, which is disposed biased to the first fixed iron core 40, is pulled to the second fixed iron core 41 side. This causes the thrust toward the one end side (left side in FIG. 1) to act to the movable iron core 43.

The shaft 44 that integrally moves with the movable iron core 43, as illustrated in FIG. 1, abuts on the pilot valve element 22 of the pilot valve PV. Then, the thrust of the solenoid Sol is transmitted to the pilot valve element 22. While the solenoid Sol is excitated, the thrust in the direction toward the one end side (left side in FIG. 1) can be provided to the pilot valve element 22 via the pulled movable iron core 43. While the solenoid Sol is not excitated, the pilot valve element 22 is pushed by the coiled spring 33 to separate from the pilot valve seat 21d. This maximally opens the pilot valve PV and causes the pilot valve element 22 to seat on the flange 34f of the fail valve seat member 34. Then, the pilot passage 23 is cutoff and the fail valve F is made effective.

Adjusting the energization amount of the solenoid Sol to the winding wire 38 ensures to adjust the thrust provided to the pilot valve element 22. This controls the valve opening pressure of the pilot valve PV. Specifically, when the current is supplied to the solenoid Sol to cause the thrust to act to the pilot valve element 22 and the thrust of the solenoid Sol overcomes the biasing force of the coiled spring 33, the pilot valve element 22 of the pilot valve PV is pressed to the pilot valve seat 21d. When the pressure of the upstream side of the pilot passage 23 acts to the pilot valve element 22, and the resultant force of the force to separate the pilot valve element 22 from the pilot valve seat 21d by the pressure and the biasing force of the coiled spring 33 exceeds the thrust of the solenoid Sol, the pilot valve PV opens to open the pilot passage 23. That is, when the pressure of the upstream side of the pilot passage 23 reaches the valve opening pressure, the pilot valve PV opens to open the pilot passage 23.

Thus, adjusting the thrust of the solenoid Sol depending on the amount of the current supplied to the solenoid Sol ensures to adjust the magnitude of the valve opening pressure of the pilot valve PV. When the pilot valve PV opens, the pressure of the upstream side of the pilot valve PV in the pilot passage 23 is equal to the valve opening pressure of the pilot valve PV. The pressure of the back pressure chamber P to which the pressure of the upstream side to the pilot valve PV of the pilot passage 23 is introduced is also controlled to be equal to the valve opening pressure of the pilot valve PV.

Next, a description will be given of the performance of the damping valve V.

When the shock absorber D expands and contracts to discharge the hydraulic oil from the rod-side chamber 13 to the discharge passage 15, the hydraulic oil in the discharge passage 15 is discharged to the reservoir 17 through the damping valve V. At this time, in the damping valve V, the pressure of the port 1a and the upstream of the pilot passage 23 increase. In the case where the damping valve V normally performs, when the current is supplied to the solenoid Sol to adjust the valve opening pressure of the pilot valve PV, the pressure between the orifice 1f and the pilot valve PV in the pilot passage 23 is introduced to the back pressure chamber P.

The internal pressure of the back pressure chamber P is controlled to be equal to the valve opening pressure of the pilot valve PV. Adjusting the valve opening pressure of the pilot valve PV by the solenoid Sol ensures to adjust the pressure that acts to the back surface of the sub valve element 3. This controls the valve opening pressure of the sub valve element 3 to open the port 1a.

Specifically, when the pressure in the rod-side chamber 13 increases the pressure in the valve-element-between chamber C, and the force to deflect the outer periphery of the sub valve element 3 toward an opening direction (rightward in FIG. 1) overcomes the internal pressure of the back pressure chamber P and the biasing force by the plate spring 27, the sub valve element 3 deflects to separate from the second valve seat 2a. This forms a gap between the sub valve element 3 and the main valve element 2 to open the port 1a. Accordingly, adjusting the magnitude of the pressure in the back pressure chamber P ensures to adjust the magnitude of the pressure of the valve-element-between chamber C as the pressure to separate the sub valve element 3 from the second valve seat 2a. That is, depending on the amount of the current provided to the solenoid Sol, the valve opening pressure of the sub valve element 3 can be controlled.

Figure 3:
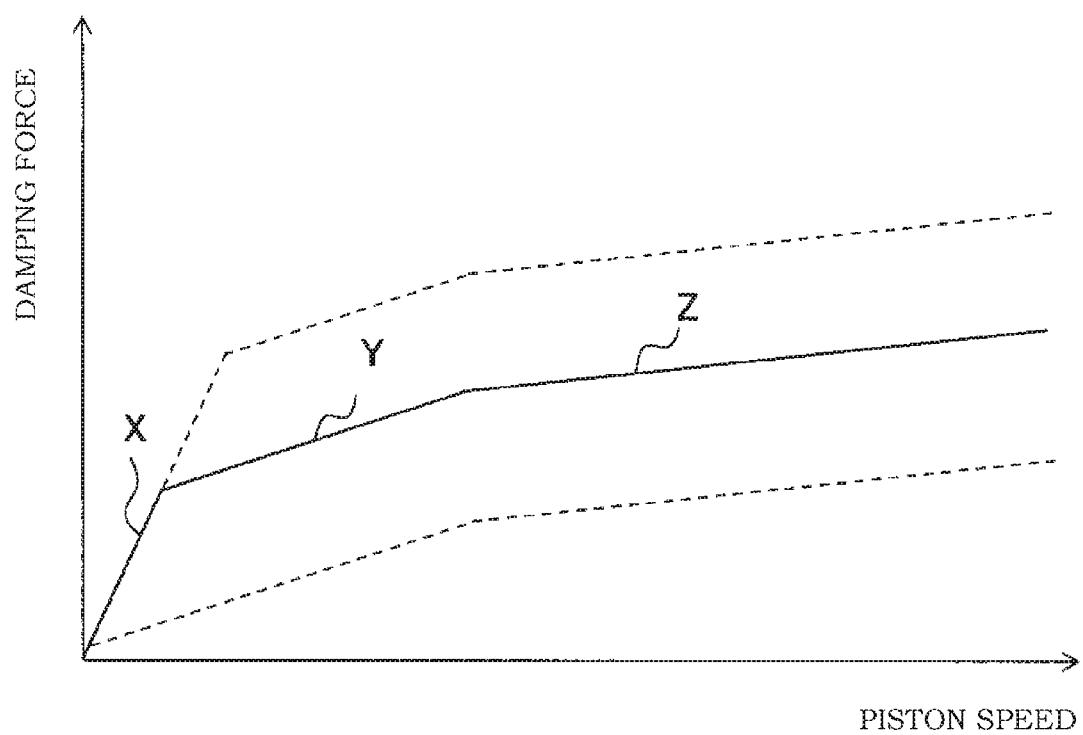
FIG. 3 is a diagram illustrating attenuation characteristics of the shock absorber to which the damping valve according to the embodiment of the present invention is applied.

Accordingly, the attenuation characteristics (characteristics of damping force with respect to piston speed) of the damping valve V is illustrated in FIG. 3. That is, until the sub valve element 3 opens, the characteristic has a constant inclination (a state indicated by a line X in FIG. 3) because the hydraulic oil passes through a sliding gap and the orifice 3a of the damping valve V. When the sub valve element 3 separates from the second valve seat 2a to open the port 1a, the inclination is decreased (a state indicated by a line Y in FIG. 3). Then, a damping coefficient is decreased.

As described above, the valve opening pressure of the sub valve element 3 is small compared with the valve opening pressure of the main valve element 2 because the intensification ratio in the sub valve element 3 is configured to be small compared with the intensification ratio in the main valve element 2. Until the differential pressure generated by the restrictive passage 5 reaches the valve opening pressure to separate the main valve element 2 from the first valve seat 1b, the main valve element 2 remains to seat on the first valve seat 1b.

On the other hand, when the piston speed of the shock absorber D increases in a state where the sub valve element 3 deflects to be opened, and the differential pressure generated by the restrictive passage 5 reaches the valve opening pressure to separate the main valve element 2 from the first valve seat 1b, the main valve element 2 separates from the first valve seat 1b against the biasing force of the disc spring 4 to open the port 1a. Then, the flow passage area is increased because the main valve element 2 separates from the first valve seat 1b to cause the port 1a to be directly communicated with the reservoir 17 without passing through the restrictive passage 5, with respect to a case where the port 1a is communicated with the reservoir 17 passing through only the restrictive passage 5 in a state where only the sub valve element 3 is opened. Accordingly, the attenuation characteristics of the damping valve V has a small inclination compared with a case where only the sub valve element 3 is opened (a state indicated by a line Z in FIG. 3). Then, the damping coefficient is further decreased.

Adjusting the energization amount to the solenoid Sol to increase and decrease the valve opening pressure of the pilot valve PV ensures to vary the attenuation characteristics of the damping valve V as moving the lines Y and Z to upper or lower within a range indicated by dashed lines in FIG. 3. The intensification ratio in the sub valve element 3 can be decreased compared with the intensification ratio in the main valve element 2. This causes the valve opening pressure of the sub valve element 3 to be decreased compared with the valve opening pressure of the main valve element 2 to relief the port 1a with two stages. Accordingly, the damping valve V ensures to decrease the damping force at the time of fully soft where the valve opening pressure of the pilot valve PV is minimum compared with a conventional damping valve. Then, the variable range of the damping force can be increased.

Accordingly, the damping valve V ensures to output a soft damping force in the case where the piston speed of the shock absorber D is in the low speed range, and prevents the damping force from the excess. The damping valve V ensures to enhance the upper limit of a hard damping force required in the case where the piston speed of the shock absorber D is in the high speed range, and prevents the damping force from the shortage. Then, applying the damping valve V to the shock absorber D ensures to enhance the variable range of the damping force and improve the vehicular ride quality.

The above-described embodiment provides the following operational advantages.

In the damping valve V, the disc spring 4 determines the position of the main valve element 2 in the radial direction, and the ring-shaped gap between the main valve element 2 and the assembling shaft 1c forms the restrictive passage 5. Then, the main valve element 2 can move in the axial direction with respect to the valve seat member 1 while maintaining the restrictive passage 5. This prevents gallings from generated by an incident where, for example, the inner periphery of the main valve element 2 is caught on the outer periphery of the shaft member.

The disc spring 4 is sufficient to provide functions to bias and determine the position of the main valve element 2 without functioning as the main valve element 2. This ensures the damping valve V to be configured such that the movement of the main valve element 2 in the axial direction is not interfered. Then, the damping valve V ensures to obtain the desired attenuation characteristics without inducing the vibration. The disc spring 4 without the necessity to dispose the restrictive passage 5 ensures the higher design freedom of the bending rigidity of the disc spring 4. This easily ensures the fatigue durability to such as the repeated deflection.

Specifically, in the case where the disc spring 4 forms the main valve element biasing part, the configuration in which the outer periphery of the disc spring 4 fits to the protrusion 2b of the main valve element 2 with the interval prevents the outer periphery of the disc spring 4 from restrained by the main valve element 2. This avoids the interference with the disc spring 4 to deflect, and ensures the main valve element 2 to move in the axial direction. The disc spring 4 does not require disposing the restrictive passage. Then, as the disc spring 4 in the embodiment, the main valve element biasing part may be formed of an annular portion and a plurality of arm portions to function as springs, or the main valve element biasing part may include a passage formed of a cutout or a hole without defining the valve-element-between chamber C. It is not necessary for this passage to provide the resistance to the passing fluid, then, the disc spring 4 can freely include the hole or the cutout. The shape of the passage is provided the degree of freedom. This ensures the bending rigidity to be provided the higher freedom of design, and the fatigue durability to the repeated deflection is easily ensured.

Figure 4:
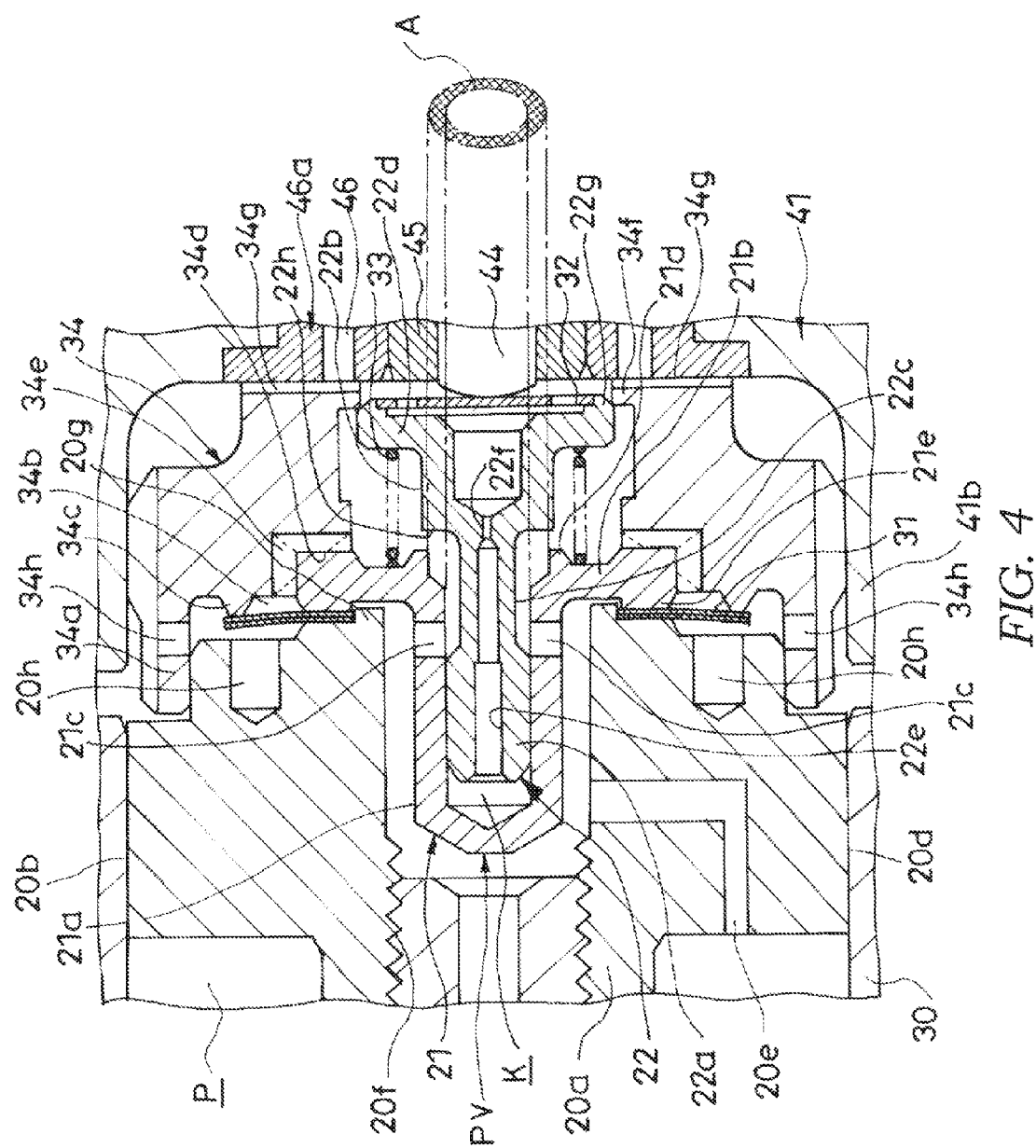
FIG. 4 is an enlarged cross-sectional view illustrating a pilot valve of the damping valve according to the embodiment of the present invention.

In this embodiment, the pilot valve PV includes the pilot valve seat member 21 and the pilot valve element 22. The pilot valve seat member 21 includes the valve housing cylinder 21a that is formed in a pipe shape and includes the through hole 21c to communicate the inside with the outside, and the circular pilot valve seat 21d that is disposed on the end portion of the valve housing cylinder 21a. The pilot valve element 22 includes the small-diameter portion 22a slidably inserted into the valve housing cylinder 21a, the large-diameter portion 22b formed with the large diameter compared with the small-diameter portion 22a, and the depressed portion 22c disposed between the small-diameter portion 22a and the large-diameter portion 22b opposing to the through hole 21c. The pilot valve PV is configured such that the end portion of the large-diameter portion 22b of the pilot valve element 22 seats on and separates from the pilot valve seat 21d. As illustrated in FIG. 4, the pilot valve PV can decrease a pressure-receiving area A to which the pressure acts in the direction that the pilot valve element 22 exits from the pilot valve seat member 21. Then, with decreasing the pressure-receiving area A, the pilot valve PV can increase the flow passage area when the valve is opened.

Figure 5:
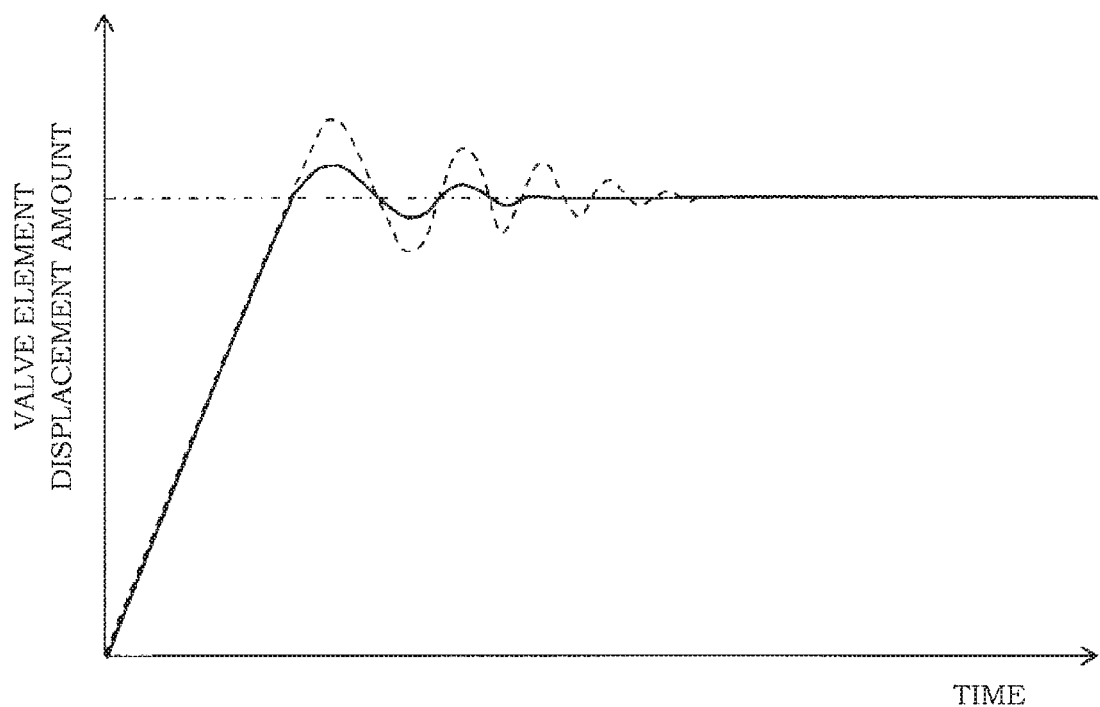
FIG. 5 is a diagram illustrating a time transition of displacement amount of the valve element after opening the pilot valve.

Here, a comparative embodiment where the pilot valve PV is a poppet valve only to open and close the port is given for comparison. In this comparative embodiment, a fictitious force also acts. Then, dynamically, the distance where the valve element of the pilot valve separates from the valve seat converges to not a position where three forces of the thrust of the solenoid, the biasing force of the coiled spring to bias the valve element, and the force to press the valve element by the pressure of the upstream of the pilot valve statically balance, but a position where three forces statically balance with displacing across the position statically balancing in a vibrating manner after once overshooting. The pilot valve in the comparative embodiment has a small flow passage area with respect to the valve opening amount of the pilot valve. Then, the distance of the pilot valve to separate from the valve seat easily increases. Accordingly, as indicated by a dashed line in FIG. 5, it takes a long time for the valve element to be stabilized on the position statically balancing (the position indicated by a one dot chain line in FIG. 5) after the pilot valve is opened. Remarkable appearance of the overshooting occurs rapid variation of the generated damping force to require a long time to stabilize the damping force.

To solve the problem, the flow passage area may be increased with respect to the valve opening amount of the pilot valve. However, this requires to increase the diameter of the annular valve seat to which the poppet valve seats on and separates from because the pilot valve in the comparative embodiment is the poppet valve. Then, the pressure-receiving area to which the pressure acts in the direction to cause the poppet valve to separate from the annular valve seat is increased. This causes the solenoid to output a large thrust to possibly upsize the damping valve.

In contrast to this, the pilot valve PV according to this embodiment ensures to decrease the pressure-receiving area that receives the pressure to cause the pilot valve element 22 to separate from the pilot valve seat 21d, and ensures to increase the flow passage area with respect to the distance of the pilot valve element 22 to separate from the pilot valve seat 21d. Then, as indicated by a solid line in FIG. 5, the time for the pilot valve element 22 to converge to the statically balancing position can be reduced without upsizing the solenoid Sol. This reduces the rapid variation of the damping force without upsizing the damping valve V. Accordingly, the stable damping force with good responsiveness can be provided.

In the damping valve V, the thrust of the solenoid Sol corresponding to the supplied current is provided to the pilot valve PV to control the internal pressure of the back pressure chamber P for adjusting the valve opening pressure of the main valve element 2 and the sub valve element 3. This ensures to adjust the internal pressure of the back pressure chamber P as desired without depending on the flow rate passing through the pilot passage 23. Then, even in the case where the piston speed of the shock absorber D is in a low region, because the damping force variation with respect to the supply current to the solenoid Sol shows a nearly linear shape, the controllability can be improved. Providing the thrust corresponding to the amount of the supply current to the solenoid Sol to the pilot valve PV controls the internal pressure of the back pressure chamber P to bias the sub valve element 3. Then, the variation of the damping force can be decreased.

In the failing, the current supply to the solenoid Sol is cut, and the coiled spring 33 pushes the pilot valve element 22. This causes the opening end of the fail valve seat member 34 on the opposite side of the valve housing 20 is closed. However, when the pressure in the rod-side chamber 13 reaches the valve opening pressure, the fail valve F opens to cause the pilot passage 23 to be communicated with the reservoir 17. This makes the fail valve F the resistance with respect to the flow of the hydraulic oil, and the shock absorber D functions as a passive shock absorber. The attenuation characteristics of the shock absorber D with respect to the piston speed in the failing can be arbitrarily set in advance based on the setting of the valve opening pressure of the fail valve F.

It should be noted that, in the case of this embodiment, the solenoid Sol is configured to control the pressure in the back pressure chamber P to control the valve opening pressure of the main valve element 2 and the sub valve element 3. However, even in the case where the solenoid Sol is not used to control the valve opening pressure of the pilot valve PV, and the pressure control of the back pressure chamber P is not performed with the pilot valve PV as a passive pressure control valve, the intensification ratio of the sub valve element 3 can be decreased compared with the intensification ratio of the main valve element 2. This ensures the attenuation characteristics to vary in two stages. Accordingly, a soft damping force can be output in the case where the piston speed is in the low speed range to prevent the damping force from the excess. A hard damping force required in the case where the piston speed is in the high speed range can be output to prevent the damping force from the shortage.

The main valve element 2 is laminated in a floating state with respect to the valve seat member 1. This ensures the port 1a to be widely opened, and ensures a damping coefficient to be decreased when the main valve element 2 is opened. This realizes the very simple damping force control by the solenoid Sol.

The disc spring 4 helps the main valve element 2 to return to the position where the main valve element 2 seats on the first valve seat 1b after the disc spring 4 biases the main valve element 2 and the main valve element 2 opens the port 1a. This avoids the occurrence of the delay of closing the port 1a when the expansion and contraction direction of the shock absorber D is changed or similar time. Then, the responsiveness of the damping force generation is improved.

In the damping valve V, the first valve seat 1b is formed in ring-shaped and the inner diameter of the second valve seat 2a is set large compared with the inner diameter of the first valve seat 1b. This ensures to provide a state where the main valve element 2 does not open even if the sub valve element 3 opens. Then, the damping valve V has the attenuation characteristics to surely relief in two stages. Both the first valve seat 1b and the second valve seat 2a are formed in ring-shaped, then, the intensification ratio of the main valve element 2 can be easily designed. It should be noted that, while forming the first valve seat 1b and the second valve seat 2a in ring-shaped ensures the simple designing of the intensification ratio, the first valve seat 1b and the second valve seat 2a are not limited to the ring-shape, and may be formed in any shape.

In this embodiment, the damping valve V includes the back pressure chamber P disposed on the opposite side of the main valve seat of the sub valve element 3, and the pressure in the back pressure chamber P biases the sub valve element 3. This prevents the valve opening pressure of the sub valve element 3 from varying by each product in the dimension management of the member to form the back pressure chamber P. Then, the stable biasing force can be provided to the sub valve element 3, and the large biasing force can be provided to the sub valve element 3.

It should be noted that, the biasing means can be constituted of only the elastic body such as a disc spring or a coiled spring. In this case, to make the biasing force in the biasing means variable, for example, it is only necessary to change an initial load provided to the elastic body by an actuator.

The damping valve V includes the pilot passage 23 to reduce the pressure of the upstream side of the port 1a to guide to the back pressure chamber P. Then, the upstream side pressure of the port 1a can be used to set the valve opening pressure of the main valve element 2 and the sub valve element 3. The damping valve V also includes the pilot valve PV to control the pressure in the back pressure chamber P. Then, the valve opening pressure of the main valve element 2 and the sub valve element 3 can be adjusted to make the damping force of the damping valve V variable.

It should be noted that, in the case of this embodiment, the orifice 1f is disposed on the pilot passage 23 to reduce the pressure of the port 1a and introduce to the back pressure chamber P. However, other than the orifice, the other throttling such as a choke may be employed to reduce the pressure.

Although an embodiment of the present invention has been described, the embodiment is merely one of application examples of the present invention and by no means limits the technical scope of the present invention to a specific configuration of the above-mentioned embodiment.

This application claims priority to Japanese Patent Application No. 2013-191337 filed in the Japanese Patent Office on Sep. 17, 2013, the entire contents of which are incorporated by reference herein.

The invention claimed is:

1. A damping valve, comprising:
   a valve seat member that includes a port and a first valve seat, the first valve seat surrounding the port;
   a shaft member disposed on the valve seat member;
   an annular main valve element mounted movable in an axial direction with respect to the shaft member, the main valve element seating on and separating from the first valve seat, and the main valve element including a second valve seat on an opposite side of the valve seat member;
   a sub valve element mounted on the shaft member, the sub valve element seating on and separating from the second valve seat;
   a valve-element-between chamber disposed between the main valve element and the sub valve element, and on an inner peripheral side of the second valve seat;
   a restrictive passage that causes the port to be communicated with the valve-element-between chamber to provide a resistance to a flow of a passing fluid;
   a main valve element biasing part configured to bias the main valve element to the first valve seat; and
   a sub valve element biasing part configured to bias the sub valve element to the annular main valve element, wherein
   the restrictive passage is formed of a ring-shaped gap between the main valve element and the shaft member.

2. The damping valve according to claim 1, wherein
   the main valve element biasing part is a disc spring secured to the shaft member, and
   the main valve element includes a protrusion to which an outer periphery of the disc spring fits with an interval, and the disc spring defines the position of the main valve element in a radial direction.

3. The damping valve according to claim 1, wherein
   the first valve seat and the second valve seat are formed in a ring shape, and
   the inner diameter of the second valve seat has a large diameter compared with the inner diameter of the first valve seat.

4. The damping valve according to claim 1, wherein
   the sub valve element biasing part includes a back pressure chamber on an opposite side of the main valve element in the sub valve element, and
   the sub valve element is configured to be biased by a pressure in the back pressure chamber.

5. The damping valve according to claim 4, wherein
   the back pressure chamber includes a pilot passage to which a pressure on the upstream side of the port is reduced and introduced.

* * * * *